US 9,207,324 B2

(12) United States Patent
Loschmidt

(10) Patent No.: US 9,207,324 B2
(45) Date of Patent: Dec. 8, 2015

(54) DEVICE FOR VEHICLE MEASURING

(71) Applicant: Kapsch TrafficCom AG, Vienna (AT)

(72) Inventor: Patrick Loschmidt, Perchtoldsdorf (AT)

(73) Assignee: Kapsch TrafficCom AG, Vienna (AT)

( * ) Notice: Subject to any disclaimer, the term of this patent is extended or adjusted under 35 U.S.C. 154(b) by 0 days.

(21) Appl. No.: 14/171,503

(22) Filed: Feb. 3, 2014

(65) Prior Publication Data
US 2014/0226146 A1     Aug. 14, 2014

(30) Foreign Application Priority Data

Feb. 14, 2013 (EP) .................................... 13155206

(51) Int. Cl.
*G01S 17/08* (2006.01)
*G08G 1/017* (2006.01)

(52) U.S. Cl.
CPC ............... *G01S 17/08* (2013.01); *G08G 1/017* (2013.01)

(58) Field of Classification Search
CPC ......... G01P 13/00; G01S 17/00; G01S 17/02; G01S 17/08
See application file for complete search history.

(56) References Cited

U.S. PATENT DOCUMENTS

| 5,682,229 A | * | 10/1997 | Wangler | 356/4.01 |
| 2005/0285738 A1 | * | 12/2005 | Seas et al. | 340/557 |
| 2008/0166023 A1 | * | 7/2008 | Wang | 382/107 |
| 2012/0113437 A1 | * | 5/2012 | Griesser | 356/625 |

FOREIGN PATENT DOCUMENTS

| EP | 2204788 | * | 7/2010 |
| EP | 2204788 A1 | | 7/2010 |

OTHER PUBLICATIONS

Translation for EP2204788.*
Extended Search Report received for European Patent Application No. 13155206.9, mailed on Jun. 18, 2013, 9 pages.

* cited by examiner

*Primary Examiner* — Luke Ratcliffe
(74) *Attorney, Agent, or Firm* — Fiala & Weaver P.L.L.C.

(57) ABSTRACT

A device for measuring a vehicle on a roadway, comprising a carrier structure, which has a support axis that can be oriented transversely over the roadway, a plurality of transmitter elements, which are distributed along the support axis on the carrier structure and each downwardly emit a light measuring beam, each light measuring beam being located in an emission direction extending normal to the support axis, at least one receiver element, which is installed on the carrier structure and receives reflected light measuring beams, and an evaluation unit, which is connected to the transmitter and receiver elements for the time of flight measurement and, based thereon, measurement of a vehicle, wherein the emission directions of at least two transmitter elements are not parallel to each other.

16 Claims, 2 Drawing Sheets

DEVICE FOR VEHICLE MEASURING

CROSS-REFERENCE TO RELATED APPLICATION(S)

This application claims priority to European Patent Application No. 13 155 206.9, filed on Feb. 14, 2013, the entirety of which is incorporated by reference herein.

BACKGROUND

1. Technical Field

The present subject matter relates to a device for measuring a vehicle on a roadway.

2. Background Art

The measuring of vehicles is of great importance in particular for establishing the suitability or authorization of the use of a road section, such as a tunnel or a toll road, or of a location, such as a parking space or city territory that is subject to tolls. Vehicles that are too high or too wide are to be stopped in time before tunnels, and usage charges are to be determined in road toll systems or at parking spaces as a function of the vehicle height and/or width. The measuring of a vehicle is to take place largely without interfering with traffic flow, which is to say while driving on the roadway. For this purpose, measuring gantries extending transversely over the roadway are installed, for example, and populated with sensors for vehicle measurement.

If the roadway has only one lane, a vehicle height, for example, can be ascertained by way of light barriers transversely radiating at various heights. As an alternative, an image can first be recorded of a vehicle, and the vehicle can thereupon be measured by way of optical image evaluation. A laser scanner installed on a measuring gantry is known from U.S. Pat. No. 6,304,321 B1, which can project two differently inclined fanned scan beams onto the road surface or vehicle surface by way of a rotating deflection mirror having differently inclined mirror facets. By fanning the laser measuring beams, shadowing effects are created so that the lateral faces of a vehicle facing away from the scanner cannot be detected and consequently not measured.

It is known from US 2004/0008514 A2 to mount a line of individual perpendicularly downwardly radiating transmitter and receiver elements for laser time of flight measurement on a measuring gantry. So as not to interfere with each other, the transceiver elements are sequentially actuated either individually or in groups, which may result in detection gaps for vehicles traveling at high speeds; it is thus not possible to reliably associate various vehicle parts or a trailer with a vehicle.

BRIEF SUMMARY

It is an object of the disclosed subject matter to create a device for measuring a vehicle, which overcomes the disadvantages of the state of the art and is also flexible to use.

This object is achieved by a device for measuring a vehicle, comprising:

a carrier structure, which has a support axis that can be oriented transversely over the roadway, a plurality of transmitter elements, which are distributed along the support axis on the carrier structure and each downwardly emit a light measuring beam, each light measuring beam being located in an emission direction extending normal to the support axis, at least one receiver element, which is installed on the carrier structure and receives reflected light measuring beams, and an evaluation unit, which is connected to the transmitter and receiver elements for time of flight measurement and, based thereon, measurement of a vehicle, the device being characterized in that the emission directions of at least two transmitter elements are not parallel to each other.

The light measuring beams together form a two-dimensional measuring area on the roadway and are still always oriented in planes that are parallel to the driving direction, so that they are able to measure a vehicle three-dimensionally without lateral shadowing effects. The beam distances transversely to the driving direction can be selected entirely independently of each other in different emission directions, whereby, depending on need, transmitter and/or receiver elements and thus additionally also computing power can be saved in the evaluation. By optimizing the arrangement and the number of transmitter and receiver elements, the load on the carrier structure is reduced, so that one-sided bracing of the consequently slim part of the carrier structure extending over the roadway also becomes possible. This part can thus also be configured to be pivotable, for example for maintenance work.

So as to simplify the evaluation of the measurement signals, it is advantageous if transmitter elements having mutually parallel emission directions form a group and the device has at least two groups. Such groups of parallel light measuring beams together form scanning lines extending transversely over the roadway and can be evaluated together or with respect to a specific task. Based on a detection of a vehicle, additional components, such as traffic cameras, could be controlled by way of a first group, or the light measuring beams of a second group can be influenced in terms of the chronological successions thereof. In this way, energy and/or computing power can be saved during low-traffic times, for example.

The transmitter elements of a first group may, as an example, have regular first distances from each other, and the transmitter elements of a second group may have regular second distances from each other that are different from the first. The mutual distances of the light measuring beams are thus adapted to different tasks which necessitate different resolutions; as a result of the regular nature of the distances, the orientation of the measuring device and the evaluation are simplified.

So as to be able to contiguously track a vehicle in the entire two-dimensional measuring area, a first group of closely spaced transmitter elements has vertical emission directions, at least one second group of transmitter elements spaced far apart from each other has emission directions at a first angle relative to the perpendicular, and at least one third group of closely spaced transmitter elements has emission directions at a second angle relative to the perpendicular. Each group of transmitter elements can serve a particular task: The evaluation unit may, as an example, be configured to evaluate the reflections of the light measuring beams of the first group for vehicle classification, those of the second group for vehicle tracking, and those of the third group for vehicle detection. When a vehicle is detected by the third group, for example, the recording of an image of the vehicle license plate number can be triggered, whereupon the vehicle can be further tracked contiguously by way of light measuring beams of the second group—having a lower resolution over a larger road section—up to the light measuring beams of the first group, which are placed closely together and, due to a vertical emission direction, provide reflections that can be received particularly well, so that the vehicle classification can be carried out with high precision. Thanks to the contiguous tracking of the vehicle through the entire two-dimensional measuring area, the combination of the vehicle license plate number and the measurement or classification result is failsafe.

As an alternative (or in addition), it is also possible, after a vehicle classification by way of the first group, to track the vehicle up until (renewed) detection using a downstream second group and a (further) third group and thereupon, if so desired, to trigger the recording of an (additional) image, for example for front and rear photos of the same vehicle and the license plate thereof.

A dedicated receiver element may, for example, be associated with each transmitter element on the carrier structure in the immediate vicinity thereof. This allows a simplified association during the evaluation of the individual reflected light measuring beams and also simplifies the orientation of the transmitter and receiver elements. This also makes it easier for multiple or all transmitter elements to simultaneously emit light measuring beams, which are received by the respective associated receiver elements and evaluated by way of the evaluation unit with respect to the time of flight.

So as to reduce the interfering influence of scattered light, an aperture may, as an example, be provided upstream of each receiver element. In addition to reducing the susceptibility to faults from environmental influences, reflections of the light measuring beams of neighboring transmitter elements are thus also suppressed, which allows the simultaneous operation of multiple or all transmitter elements.

In one example variant, the device is characterized in that each transmitter element is formed by the outlet end of a light conducting fiber, which is fed by a light source. Due to the low weight of the fibers, a particularly slim and light-weight carrier structure is achieved, so that rapid installation and maintenance are facilitated and the visual impairment of the surroundings is reduced.

The light conducting fibers may, as an example, originate from a central location in the device, at which a light source is arranged for each of one or more light conducting fibers. Light sources can thus be saved, and the remaining one(s) can be serviced centrally, if necessary. This also ensures the simultaneous operation of multiple or even all transmitter elements. The light conducting fibers can also be guided out of the carrier structure and, for example, be relocated into an associated control box of the device, whereby they become accessible even more easily.

Each receiver element may, for example, be formed by the inlet end of a light conducting fiber, which is supplied to an optoelectronic transducer. Similarly to the above-mentioned variant, this reduces the weight along the support axis. At the same time, such an embodiment allows the reflected light measuring beams to be centrally evaluated directly based on the optical signals.

With such a central evaluation, the optoelectronic transducer may, as an example, be an image sensor, on each of the pixels of which one of the light conducting fibers is routed. Such an image sensor that is suitable for time of flight measurement can also detect and associate simultaneously emitted light measuring beams, or the reflections thereof, with respect to the time of flight thereof with pinpoint precision and determine individual distances. The image sensor can again be situated in a central location, for example in the control box on the carrier structure.

In an alternative variant, the transmitter elements are light-emitting diodes (LEDs) or laser diodes, and the receiver elements are optoelectronic transducers, which are exposed to the outside on the carrier structure. This reduces the complexity for a central actuation and evaluation, since in this case transmitter and receiver elements require or provide only electrical signals. A mixed embodiment, for example having decentralized light-emitting or laser diodes as transmitter elements and the inlet ends of light conducting fibers as receiver elements having a central image sensor, or conversely having central light-emitting or laser diodes and outlet ends of light conducting fibers as transmitter elements and decentralized optoelectronic transducers, such as photodiodes, would likewise be possible. Due to the small size of today's light-emitting diodes, laser diodes and photodiodes, the slim carrier structure is thus preserved.

The carrier structure can be composed as a standardized module, which is populated with transmitter and receiver elements as desired, by the carrier structure having a plurality of prepared seats for a respective transmitter and/or receiver element, the seats being distributed in a grid-like manner over a downwardly directed side of the carrier structure. Depending on the population of the prepared seats, different mutual distances of the transmitter and/or receiver elements in different emission directions can thus be easily achieved, along with an adaptation to different ambient conditions and tasks. It is also possible to have the individual seats already prepared for predetermined emission directions and/or they may assign a prepared field of view to the receiver elements.

For example, the seats may be clip holders for inserting light-emitting diodes, laser diodes and/or optoelectronic transducers. This allows a rapid installation and/or removal of these components, while the population remains arbitrary. The wall thickness of the carrier structure, which should be as small as possible, reduces the weight of the structure.

As an alternative, the seats may, as an example, be ducts penetrating a wall of the carrier structure for light conducting fibers to pass through. In view of the small fiber diameters, such ducts can likewise be very narrow and thus favor the rapid insertion of the fibers.

It may be advantageous if the outer sections of the seats are configured as apertures. These can be a region having a smaller diameter of these ducts or some of the seats configured on the clip holders, whereby separate components are dispensed with.

Further features and advantages, as well as the structure and operation of various embodiments, are described in detail below with reference to the accompanying drawings.

BRIEF DESCRIPTION OF THE DRAWINGS/FIGURES

The present subject matter will be described hereafter in greater detail based on exemplary embodiments shown in the accompanying drawings. In the drawings.

Embodiments will now be described with reference to the accompanying drawings.

DETAILED DESCRIPTION

Figure 1:
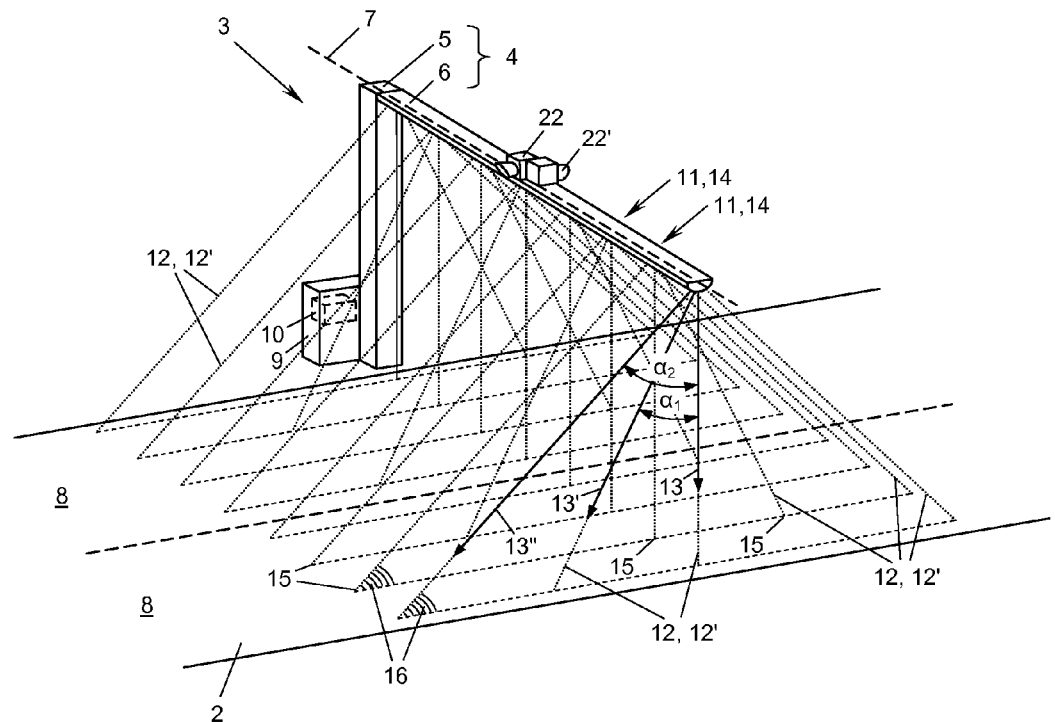
FIG. 1 shows a perspective view from above onto the device according to an embodiment for measuring a vehicle on a roadway.
Figure 2:
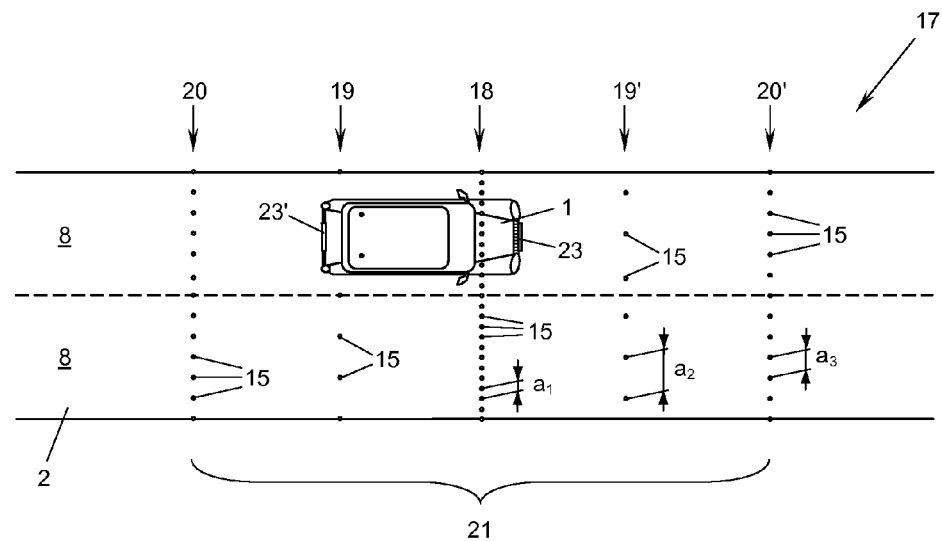
FIG. 2 shows a top view onto a vehicle on a roadway and light measuring beams reflected thereby, which are emitted by a device according to FIG. 1.

According to FIGS. 1 and 2, a vehicle 1 is measured at least with respect to the width and height thereof by way of a device 3 while driving on a roadway 2. The measuring device 3 comprises a carrier structure 4 having at least one stanchion 5 and an elongated measuring head 6, which is braced thereon and forms a support axis 7 extending transversely over the roadway 2. Depending on the width of the roadway 2 or the number of the lanes 8 thereof, the carrier structure 4 can also comprise additional stanchions 5. The measuring head 6 can be installed on the stanchion 5 so as to pivot about a vertical axis, so that it can be pivoted away from the roadway 2 for maintenance purposes. The device 3 further comprises a control box 9 for accommodating an evaluation unit 10 and additional components.

Figure 3:
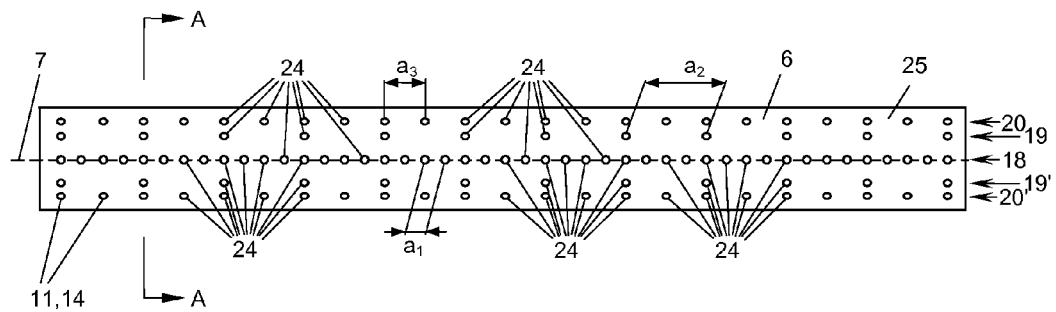
FIG. 3 shows a view from beneath of the measuring head of the device of FIG. 1 extending transversely over the roadway.
Figure 4:
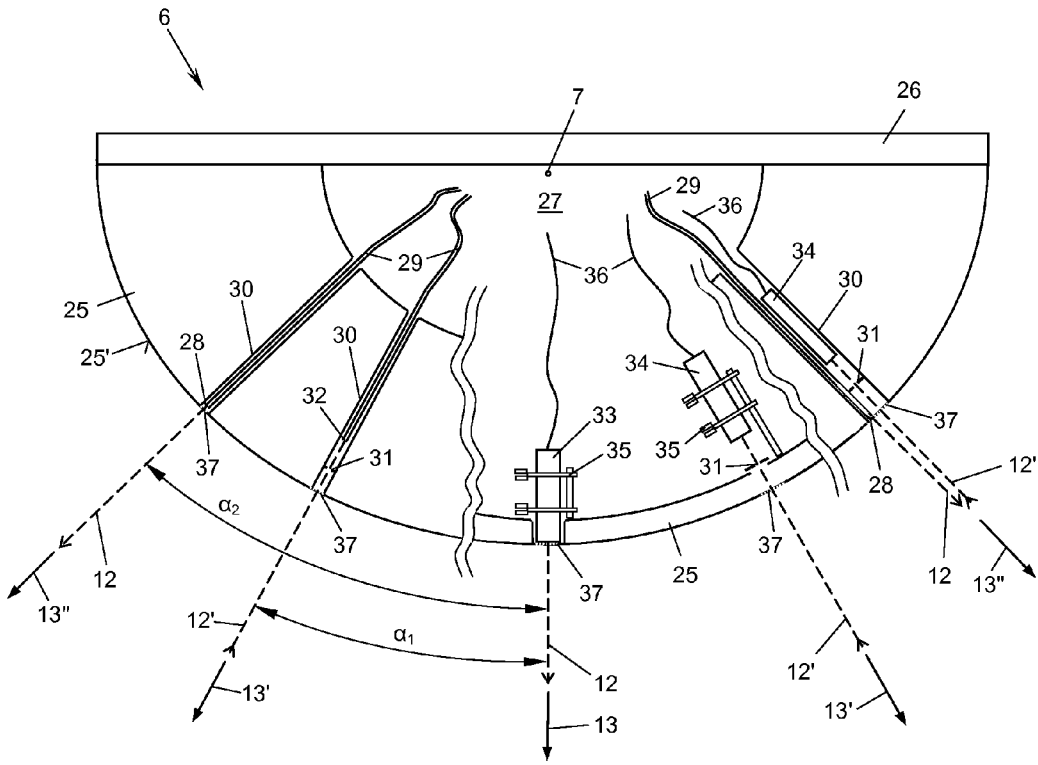
FIG. 4 shows partial cross-sections through different embodiments of the measuring head of FIG. 3 along the intersecting line A-A of FIG. 3.

A plurality of transmitter elements 11 are distributed on the measuring head 6 along the support axis 7 (FIG. 3). Each transmitter element 11 emits a light measuring beam 12, such as a laser beam, in an emission direction 13, 13', 13" downward onto the roadway 2, or onto a vehicle 1 located thereon (FIG. 4). The measuring head 6 additionally carries at least one receiver element 14 for light measuring beams 12' reflected by the vehicle 1 or the roadway 2. It is possible to provide one receiver element 14 for all transmitter elements 11 or for each group of transmitter elements 11, or a dedicated receiver element 14 for each transmitter element 11.

The evaluation unit 10 is connected to the transmitter and receiver element 11, 14 and, based on the time of flight of each individual light measuring beam 12, 12' that is emitted and reflected, for example the time period between the emission of a light pulse by a transmitter element 11 and the reception of the reflected light pulse in a receiver element 14, and based on the known positions of the transmitter and receiver elements 11, 14, calculates the positions of the impingement points 15 of the light measuring beams 12 on the roadway 2 or the vehicle 1, so as to create from this a point-by-point 2.5D or 3D image (a "scanning point cloud") of the roadway 2 or of the vehicle 1, as is known in the art.

As is shown in FIGS. 1 and 4, the emission directions 13, 13', 13" of at least two transmitter elements 11, and thus of the light measuring beams 12 thereof, are not parallel to each other. Each light measuring beam 12 is located in a plane 16 which is normal relative to the support axis 7 and intersects the roadway 2 approximately parallel to the lanes 8. Light measuring beams 12 having non-parallel emission directions 13, 13', 13" can be located in one and the same plane or in different planes 16. The device 3 thus projects a two-dimensional pattern 17 of impingement points 15 onto the roadway 2 or the vehicle 1, see FIG. 2.

In the pattern 17, light measuring beams 12 having mutually parallel emission directions 13, 13', 13" each form a group 18, 19, 19', 20, 20' (FIG. 2), for which purpose the transmitter and receiver elements 11, 14 may, as an example, be arranged in corresponding groups 18, 19, 19', 20, 20' (FIG. 3). In the embodiment shown, the transmitter elements 11 of a first group 18 having vertical emission directions 13 have regular, narrow first distances $\alpha_1$ from each other, those of second groups 19, 19' having emission directions 13' at first angles $\alpha_1$ ($0<\alpha_1<90°$) relative to the perpendicular ($\alpha=0$) have regular, wide second distances $a_2$ from each other, and those of third groups 20, 20' having emission directions 13" at second angles $\alpha_2$ ($\alpha_1<\alpha_2<90°$) relative to the perpendicular have regular, narrow third distances $\alpha_3$ from each other. It is also possible to provide more than one second group 19, 19' between the central first group 18 and the outer third groups 20, 20'.

The evaluation unit 10 may, as an example, be configured to evaluate the reflections 12' of the light measuring beams 12 of the first group 18 for vehicle measurement and classification, those of the second groups 19, 19' for vehicle tracking over the entire measuring area 21 of the pattern 17, and those of the third groups 20, 20' for vehicle detection (triggering) when a vehicle 1 enters and exits the measuring area 21. The outer (third) groups 20, 20' can be used in particular as line detectors, for example so as to trigger the recording of an image by a camera unit 22, 22' which is installed for this purpose on the carrier structure 4 and/or so as to reduce the pauses between two light pulses of the light measuring beams 12 of groups 18, 19, 19', 20, 20' provided downstream in the driving direction. The camera unit 22, 22' records a front or rear view of the vehicle 1 with the front or rear license plate number 23, 23' and, if desired, the driver. The mutual distances $a_3$ of the third groups 20, 20' are selected in such a way that a vehicle 1 can be detected reliably, and optionally also with lane precision, so as to trigger a camera unit 22, 22', for example, which is directed at the correct lane 8. The measuring area 21 of the pattern 17 in the longitudinal direction of the roadway 2 may, as an example, be larger than the longest anticipated vehicle 1 to be measured or classified, and may, as an example, be a multiple thereof.

Depending on the application, other arrangements or sequences of the groups 18, 19, 19', 20, 20' are also possible, of course, for vehicle detection, tracking and classification (measurement). A simple case, for example, includes at least two different groups having different resolutions in the sensor areas thereof for the tracking-triggering or triggering-tracking sequence, and the like. A combination with additional sensors, such as microwave radio devices for communicating with a device carried on board the vehicle for toll capturing, are likewise possible.

Finally, the width and height of the vehicle 1 may, as an example, be measured by the particularly closely spaced transmitter elements 11 of the first group 18, or a 2.5D or 3D scanning point cloud thereof is created when passing the group 18, so as to classify the vehicle 1, for example. The close distance $a_1$ results in a high resolution during this measurement or classification.

Between the detector groups 20, 20' and the measurement and classification group 18, the vehicle 1 is detected by the light measuring beams 12 of the second group 19, 19' ("tracking groups") as it passes through the measuring area 21. In the present exemplary embodiment, this is used to contiguously track the vehicle 1 in the entire measuring area 21 and thereby be able to clearly associate an image recorded by the camera units 22, 22', which was trigged by way of the third groups 20, 20', for example, with a vehicle 1 that was measured and classified by way of the first group 18. It is sufficient for this purpose if the transmitter elements 11 of the second groups 19, 19' are spaced far apart from each other ($a_2>a_1$, $a_2>a_3$).

The distances $a_1$, $a_2$, $a_3$ of the transmitter elements 11 of the different groups 18, 19, 19', 20, 20' can, of course, be selected differently from those in the illustrated example. It is also possible for additional groups or other suitable, even irregular, patterns 17 to be emitted. The light measuring beams 12 can be in the visible wavelength range, however they are invisible in the present example, so as to avoid interference with traffic.

The measurement of the length of the vehicle 1 or the scaling of the scanning point cloud thereof can be achieved, for example, by combining the evaluations of multiple receiver elements 14 of different groups 18, 19, 19', 20, 20' or with the aid of an additional speed measurement of the vehicle 1. Such a speed measurement can take place by way of separate speed sensors (not shown), or by way of Doppler measurement with the aid of the transmitter elements 11 emitting at an angle $\alpha_1$, $\alpha_2$ relative to the perpendicular, or based on the time period between the detection of a vehicle 1 with the aid of one of the groups 18, 19, 19', 20, 20' and the detection with the aid of a downstream group.

FIGS. 3 and 4 show the optomechanical design of the measuring head 6 in detail. The measuring head 6 comprises a plurality of prepared seats 24, in each case for a transmitter element 11 and/or a receiver element 14. The seats 24 are distributed in a grid-shaped manner across the downwardly facing side 25' of the wall 25 of the measuring head 6. The group-wise emission directions 13, 13', 13" shown in FIGS. 1 and 2 can be predefined by the orientations of the seats 24, see the approximately semi-circular or U-shaped cross-section of the wall 25 in FIG. 4, the wall 25 together with an upper protective cover 26 also forming a channel 27 extending in the direction of the support axis 7.

Line by line, the seats 24 shown in FIG. 3 form the groups 18, 19, 19', 20, 20' of transmitter elements 11. However, it is also possible to provide more seats 25 than necessary—for example in a regular grid-shaped pattern—which are then populated with transmitter and/or receiver elements 11, 14 according to the desired pattern 17. The measuring head 6 can also have a cross-section that is different from a U shape, for example an O-shaped or rectangular cross-section.

FIG. 4 shows different variants of transmitter and receiver elements 11, 14 next to each other in one and the same drawing, the variants generally constituting alternatives, however it also being possible to combine them in the same device 3.

In a first variant, which is the variant shown on the left in FIG. 4, a transmitter element 11 can be formed by the outlet end 28 of a light conducting fiber 29. The seat 24 may, as an example, be a duct 30 for this purpose, which penetrates the wall 25, so that the light conducting fiber 29 or the light measuring beam 12 can pass through. The light conducting fibers 29 can be routed via the channel 27 to a central location in the device 3, for example the control box 9, where they are fed by a shared or group-wise or respective individual light source (not shown).

Likewise a receiver element 14 can be formed by the inlet end 32 of a light conducting fiber 29, which is routed to an optoelectronic transducer (not shown). The optoelectronic transducer can also be centrally arranged, such as in the control box 9. The optoelectronic transducer can be an image sensor, such as photo diode array chip, on which each of the light conducting fibers 29 is routed on a separate pixel of the image sensor. As an alternative, each light conducting fiber 29 could supply a separate photodiode.

An aperture 31 can be connected upstream of the light conducting fiber 29 of the receiver element 14, the aperture limiting the field of view of the receiver element 14 in such a way that the same receives only a single reflected light measuring beam 12', which is to say that of the associated transmitter element 11. In this way, neighboring or even all transmitter elements 11 can send simultaneously. The aperture 31 can be a separate aperture, which optionally is provided with additional optics, or it can simply be formed by a smaller diameter of the duct 30 itself, in which the inlet end 32 of the light conducting fiber 29 is recessed. Instead of limiting the fields of view of the receiver elements 14, alternatively all transmitter elements 11—or at least those located close to each other—could be sequentially actuated or operated so as to prevent stray reflected light measuring beams 12' of non-associated transmitter elements 11 from being picked up a receiver element 14.

In a second variant, which is shown in the center of FIG. 4, at least some of the transmitter elements 11 can also be light-emitting diodes (LEDs) or laser diodes 33 and/or at least some of the receiver elements 14 can be optoelectronic transducers 34, such as photodiodes, which are exposed to the outside on the carrier structure 4, so that the light measuring beams 12, 12' can be emitted and/or received without impairment. The seats 24 for light-emitting diodes, laser diodes or photodiodes 33, 34 can likewise be suitably shaped ducts 30 penetrating the wall 25, or may, as an example, be clip holders 35, in which the light-emitting diodes, laser diodes and/or photodiodes 33, 34 can be inserted, for example detachably. The outer sections of the seats 24, in particular those of the receiver elements 14, can again optionally be configured as apertures 31. In this embodiment, the light-emitting diodes, laser diodes and photodiodes 33, 34 are connected to the evaluation unit 10 via electrical signal lines 36, which are routed in the channel 27, for example.

Of course, the seats 24, regardless of whether they are configured as clip holders 35 or as ducts 30, can in each case accommodate both a transmitter element 11 and an associated receiver element 14, or more than one transmitter and/or receiver elements 11, 14, as is illustrated by a third variant shown on the right in FIG. 4, in which a light conducting fiber 29 having an outlet end 28 as the transmitter element 11 and a photodiode 34 accommodated in the same duct 30 are shown by way of example. Any other combination and/or variation of transmitter and/or receiver elements 11, 14 is likewise conceivable. One and the same light conducting fiber 29 could also be used both as a transmitter and receiver element 11, 14, if both a light measuring beam 12 is coupled in and the reflection 12' thereof is coupled out at the end opposite the seat 24, for example by way of a semitransparent mirror. Such an option also exists for several combined light conducting fibers 29, which are fed together and evaluated with the aid of an image sensor.

The seats 24 can be closed to the outside by transparent cover plates 37 and protected against soiling. The cover plates 37 can also be filters to keep undesirable optical wavelengths, for example, away from the receiver elements 14 and/or they can be polarizers, wherein identically polarized cover plates 37 are provided upstream of mutually associated transmitter and receiver elements 11, 14.

CONCLUSION

The invention is not limited to the shown embodiments, but encompasses all variants, combinations and modifications that are covered by the scope of the accompanying claims.

What is claimed is:

1. A device for measuring a vehicle on a roadway, comprising:
   a carrier structure, which has a support axis that can be oriented transversely over the roadway;
   a plurality of transmitter elements, which are distributed along the support axis on the carrier structure and each downwardly emit a light measuring beam, each light measuring beam having an emission direction that is normal to the support axis;
   at least one receiver element, which is installed on the carrier structure and receives reflected light measuring beams; and
   an evaluation unit, which is connected to the transmitter and receiver elements for time of flight measurement and, based thereon, measurement of a vehicle;
   wherein the emission directions of at least two transmitter elements are not parallel to each other, transmitter elements having mutually parallel emission directions form a group, and the device has at least two groups.

2. The device according to claim 1, wherein the transmitter elements of a first group have regular first distances from each other, and the transmitter elements of a second group have regular second distances from each other that are different from the first.

3. The device according to claim 1, comprising a first group of closely spaced transmitter elements having vertical emission directions, at least one second group of transmitter elements spaced far apart from each other having emission directions at a first angle relative to the perpendicular, and at least one third group of closely spaced transmitter elements having emission directions at a second angle relative to the perpendicular.

4. The device according to claim 3, wherein the evaluation unit is configured to evaluate the reflections of the light measuring beams of the first group for vehicle classification, those of the second group for vehicle tracking, and those of the third group for vehicle detection.

5. The device according to claim 1, wherein a dedicated receiver element is associated with each transmitter element in an immediate vicinity thereof.

6. The device according to claim 1, wherein an aperture is provided upstream of each receiver element.

7. The device according to claim 1, wherein each transmitter element is formed by an outlet end of a light conducting fiber, which is fed by a light source.

8. The device according to claim 7, wherein the light conducting fibers originate from a central location in the device, at which a light source is arranged for each of one or more light conducting fibers.

9. The device according to claim 1, wherein each receiver element is formed by an inlet end of a light conducting fiber, which is routed to an optoelectronic transducer.

10. The device according to claim 9, wherein the optoelectronic transducer is an image sensor, on each pixel of which one of the light conducting fibers is routed.

11. The device according to claim 1, wherein the transmitter elements are light-emitting or laser diodes, and the receiver elements are optoelectronic transducers, which are exposed to the outside on the carrier structure.

12. A device for measuring a vehicle on a roadway, comprising:
 a carrier structure, which has a support axis that can be oriented transversely over the roadway;
 a plurality of transmitter elements, which are distributed along the support axis on the carrier structure and each downwardly emit a light measuring beam, each light measuring beam having an emission direction that is normal to the support axis;
 at least one receiver element, which is installed on the carrier structure and receives reflected light measuring beams; and
 an evaluation unit, which is connected to the transmitter and receiver elements for time of flight measurement and, based thereon, measurement of a vehicle;
 wherein the emission directions of at least two transmitter elements are not parallel to each other; and
 wherein the carrier structure has a plurality of prepared seats, in each case for at least one of a transmitter or receiver element, the seats being distributed in a grid-shaped manner across a downwardly facing side of the carrier structure.

13. The device according to claim 12, wherein the transmitter elements are light-emitting or laser diodes, and the receiver elements are optoelectronic transducers, and wherein the seats are clip holders for inserting at least one of said diodes or transducers.

14. The device according to claim 12, wherein each transmitter element is formed by an outlet end of a light conducting fiber, and wherein the seats are ducts penetrating a wall of the carrier structure for the light guiding fibers to pass through.

15. The device according to claim 12, wherein each receiver element is formed by an inlet end of a light conducting fiber, and wherein the seats are ducts penetrating a wall of the carrier structure for the light guiding fibers to pass through.

16. The device according to claim 12, wherein outer sections of the seats are configured as apertures.

* * * * *